(12) United States Patent
Strandborg et al.

(10) Patent No.: US 12,462,472 B1
(45) Date of Patent: Nov. 4, 2025

(54) METHODS AND SYSTEMS FOR PREVENTING IMAGE TEARING

(71) Applicant: Distance Technologies Oy, Helsinki (FI)

(72) Inventors: Mikko Strandborg, Hangonkylä (FI); Dhiraj Neve, Pune (IN)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 18/912,727

(22) Filed: Oct. 11, 2024

(51) Int. Cl.
*G06T 15/20* (2011.01)
*G06F 3/01* (2006.01)

(52) U.S. Cl.
CPC .............. *G06T 15/20* (2013.01); *G06F 3/012* (2013.01)

(58) Field of Classification Search
CPC ................................ G06T 15/20; G06F 3/012
See application file for complete search history.

(56) References Cited

U.S. PATENT DOCUMENTS

| | | | | |
|---|---|---|---|---|
| 11,127,195 B2* | 9/2021 | Yeoh | ...................... | G06T 19/006 |
| 11,822,713 B2* | 11/2023 | Lahr | ....................... | G06F 3/012 |
| 12,374,061 B2* | 7/2025 | Ikenishi | ..................... | G06T 7/73 |
| 2015/0002542 A1* | 1/2015 | Chan | ......................... | G06T 3/02 |
| | | | | 345/633 |
| 2015/0029218 A1* | 1/2015 | Williams | ........... | G02B 27/0172 |
| | | | | 345/633 |
| 2016/0364904 A1* | 12/2016 | Parker | ..................... | G06F 3/038 |
| 2018/0146189 A1* | 5/2018 | Park | ..................... | H04N 13/344 |

* cited by examiner

*Primary Examiner* — Mihir K Rayan
(74) *Attorney, Agent, or Firm* — ZIEGLER IP LAW GROUP, LLC.

(57) ABSTRACT

A first future pose (FFP) is predicted using first tracking data. An image is generated based on the FFP, the image with stripes, each stripe having scanlines. A second future pose (SFP) is predicted using second tracking data. The image is reprojected by performing, from a first stripe to a last stripe: determining a start pose for a given stripe; reprojecting starting scanline(s) of the given stripe, from the FFP to the start pose, whilst predicting an end pose for the given stripe; reprojecting intermediate scanline(s) of the given stripe from the FFP to an interpolated pose; and reprojecting ending scanline(s) of the given stripe from the FFP to the end pose, wherein a start pose for the first stripe is the SFP, and wherein the end pose for the given stripe is served as a start pose for its next stripe. Stripes of a reprojected image are sent to a display.

16 Claims, 4 Drawing Sheets

METHODS AND SYSTEMS FOR PREVENTING IMAGE TEARING

TECHNICAL FIELD

The present disclosure relates to methods for preventing image tearing. The present disclosure also relates to systems for preventing image tearing.

BACKGROUND

In modern extended-reality (XR) systems, achieving a low latency, high-quality rendering is essential to provide a seamless and immersive viewing experience for users. In this regard, high-end XR compositors often employ techniques, for example, such as beam chasing, for image rendering. Herein, the image rendering is typically performed in a stripe-by-stripe manner, where each stripe is rendered sequentially. During such image rendering, late-stage reprojection (LSR) is also performed, which adjusts visual content of an image, based on most-recent head pose predictions.

However, despite these advancements, a key drawback associated with such XR systems arises from an unpredictability of user's head movements. Since a head pose of the user is dynamic, the accuracy of predicting the head poses of the user is low. Although the accuracy of predicting the head poses improves as more-recent tracking data is available more frequently, and an extrapolation time approaches zero, there can still be inconsistencies in predicting the head poses. For example, a predicted end pose for one stripe and a predicted start pose for its next stripe often differ considerably, as they are predicted based on tracking data collected at different time instants. In such a case, when the LSR is performed on the image (prior to its displaying), it can result in visual discontinuities (commonly referred to as "image tearing"), where certain segments of a reprojected image appears to be misaligned or disconnected. This significantly deteriorates a viewing experience of a user (for example, in terms of realism or immersiveness), when a sequence of reprojected images are displayed to the user.

Therefore, in light of the foregoing discussion, there exists a need to overcome the aforementioned drawbacks.

SUMMARY

The present disclosure seeks to provide a system and a method which facilitate in generating and displaying highly accurate, realistic images (upon reprojection) that are free from any visual discontinuities (such as image tearing), in real time or near-real time, thereby resulting in a smooth, immersive viewing experience for a user. The aim of the present disclosure is achieved by a system and a method for preventing image tearing, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 3A illustrates an exemplary image that is generated based on a first future pose, while

FIG. 4A illustrates an ideal image that is to be reprojected prior to displaying at a display, while

DETAILED DESCRIPTION OF EMBODIMENTS

Figure 1:
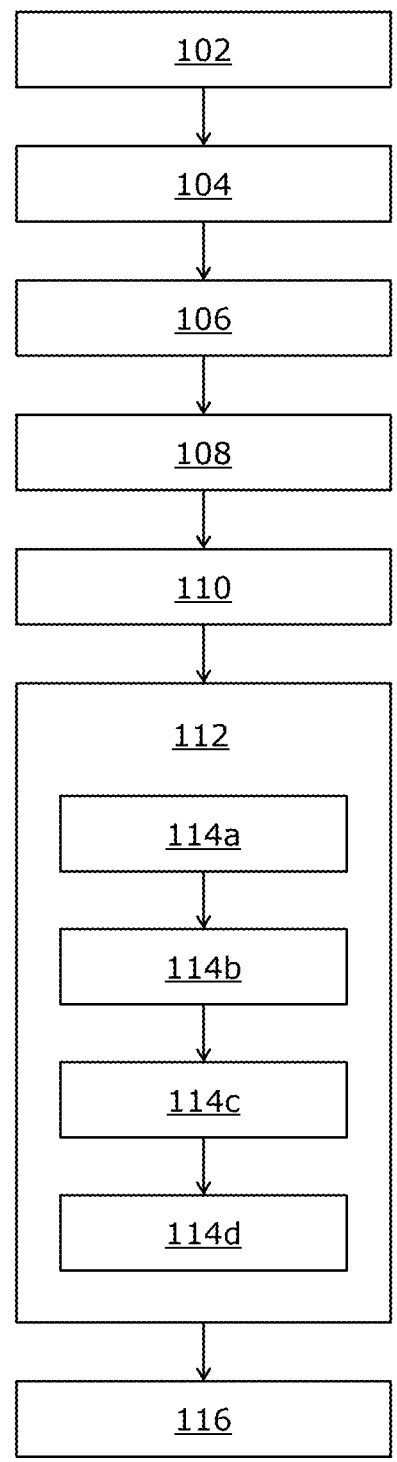
FIG. 1 illustrates steps of a method for preventing image tearing, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a method for preventing image tearing, the method comprising:

obtaining, from tracking means, first tracking data collected over a first time period;

predicting a first future pose corresponding to a future time instant, using the first tracking data;

generating an image based on the first future pose, wherein the image comprises a plurality of stripes that are generated according to the first future pose, and wherein each stripe from amongst the plurality of stripes has a plurality of scanlines;

obtaining, from the tracking means, second tracking data collected over a second time period, wherein the second time period ends after the first time period;

predicting a second future pose corresponding to the future time instant, using the second tracking data;

reprojecting the image for generating a reprojected image, in a stripe-wise manner according to a scanning pattern, wherein the step of reprojection comprises performing, from a first stripe to a last stripe from amongst the plurality of stripes:

determining a start pose for a given stripe;

reprojecting at least one starting scanline of the given stripe, from the first future pose to said start pose for the given stripe, whilst obtaining, from the tracking means, third tracking data collected over a third time period, and predicting an end pose for the given stripe using the third tracking data;

reprojecting at least one intermediate scanline of the given stripe from the first future pose to an interpolated pose between said start pose and said end pose for the given stripe; and reprojecting at least one ending scanline of the given stripe from the first future pose to said end pose for the given stripe, wherein a start pose for the first stripe is determined as the second future pose, and wherein the end pose for the given stripe is to be served as a start pose for its next stripe; and sending stripes of the reprojected image to a display for displaying thereat in the stripe-wise manner.

In a second aspect, an embodiment of the present disclosure provides a system comprising at least one processor, wherein the at least one processor is configured to:

obtain, from tracking means, first tracking data collected over a first time period;

predict a first future pose corresponding to a future time instant, using the first tracking data;

generate an image based on the first future pose, wherein the image comprises a plurality of stripes that are generated according to the first future pose, and wherein each stripe from amongst the plurality of stripes has a plurality of scanlines;

obtain, from the tracking means, second tracking data collected over a second time period, wherein the second time period ends after the first time period;

predict a second future pose corresponding to the future time instant, using the second tracking data;

reproject the image to generate a reprojected image, in a stripe-wise manner according to a scanning pattern, wherein when reprojecting said image, from a first stripe to a last stripe from amongst the plurality of stripes, the at least one processor is configured to:

determine a start pose for a given stripe;

reproject at least one starting scanline of the given stripe, from the first future pose to said start pose for the given stripe, whilst obtaining, from the tracking means, third tracking data collected over a third time period, and predicting an end pose for the given stripe using the third tracking data;

reproject at least one intermediate scanline of the given stripe from the first future pose to an interpolated pose between said start pose and said end pose for the given stripe; and reproject at least one ending scanline of the given stripe from the first future pose to said end pose for the given stripe, wherein a start pose for the first stripe is determined as the second future pose, and wherein the end pose for the given stripe is to be served as a start pose for its next stripe; and send stripes of the reprojected image to a display for displaying thereat in the stripe-wise manner.

The present disclosure provides the aforementioned method and the aforementioned system which facilitate in generating and displaying highly accurate, realistic images (upon reprojection) that are free from any visual discontinuities (such as image tearing), in real time or near-real time, thereby resulting in a smooth, immersive viewing experience for a user. Herein, a synergistic combination of employing the end pose for the given stripe as the start pose for the next stripe, and reprojecting of the at least one intermediate scanline based on the interpolated pose enable in providing a continuity and a smooth transition between two consecutive stripes of the image. In this way, unlike the prior art, abrupt jumps or considerable mismatches in tracked poses of the user's head at a time instant between a transition between the two consecutive stripes do not adversely impact reprojection of the image. Beneficially, due to this, a likelihood of visual discontinuities or artifacts (such as the image tearing, stuttering, and the like) in the reprojected image is also prevented. This significantly improves an overall viewing experience of the user (for example, in terms of realism and immersiveness), as an overall visual continuity is enhanced, as a sequence of reprojected images is displayed to the user. This also ensures that when a pose of the user's head is changing whilst viewing an object, visual representation of said object being displayed to the user (via displaying the sequence of reprojected images) would be well-consistent with a motion of user's head, and would also be stutter-free. The method and the system are simple, robust, fast, reliable, support real-time prevention of image tearing, and can be implemented with ease.

The term "image tearing" refers to a visual discontinuity that occurs between different stripes of an image that is to be displayed to a user. The image tearing generally occurs when an accuracy of predicting a pose of the user's head is significantly low. For example, the image tearing may occur when a predicted pose of the user's head used for reprojecting an end of a given stripe of the image is different from a predicted pose of the user's head used for reprojecting a start of a next stripe to the given stripe. Since such predicted poses are estimated at slightly different time instants, a reprojected version of said image often has a noticeable "tear" between its stripes. In typical beam-chasing compositor-based systems, the image tearing occurs because the display is updating visual information corresponding different sections of the image, based on head pose predictions that do not perfectly match an actual movement of the user's head.

Throughout the present disclosure, the term "tracking means" refers to specialised equipment for detecting and/or following at least the user's head. It will be appreciated that an implementation of the tracking means may depend on a type of the display. Optionally, in this regard, when the display is implemented as a display of a head-mounted display (HMD) device, the tracking means is implemented as at least one of: an optics-based tracking system, an acoustics-based tracking system, a radio-based tracking system, a magnetism-based tracking system, an accelerometer, a gyroscope, an Inertial Measurement Unit (IMU), a Timing and Inertial Measurement Unit (TIMU). In such a case, the tracking means may employ an outside-in tracking technique, an inside-out tracking technique, or a combination of both the aforesaid techniques, for collecting the given tracking data. The term "head-mounted display" device refers to a specialised equipment that is configured to present an extended-reality (XR) environment to the user when the HMD device, in operation, is worn by the user on his/her head. The HMD device is implemented, for example, as an XR headset, a pair of XR glasses, and the like, that is operable to display a scene of the XR environment to the user. The term "extended-reality" encompasses virtual reality (VR), augmented reality (AR), mixed reality (MR), and the like. HMDs and their forms are well-known in the art.

Alternatively, optionally, when the display is implemented as a heads-up display, the tracking means is implemented as at least one tracking camera. Optionally, the at least one tracking camera comprises at least one of: at least one visible-light camera, at least one IR camera. Examples of a given visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB)

camera, a Red-Green-Blue-Infrared (RGB-IR) camera, and a monochrome camera. Optionally, the at least one tracking camera further comprises at least one depth camera, in addition to the at least one of: the at least one visible-light camera, the at least one IR camera. Examples of the at least one depth camera include, but are not limited to, a Time-of-Flight (ToF) camera, a light detection and ranging (Li-DAR) camera, a Red-Green-Blue-Depth (RGB-D) camera, a laser rangefinder, a stereo camera, a plenoptic camera, a ranging camera, a Sound Navigation and Ranging (SONAR) camera. The term "heads-up display" refers to a display that is capable of displaying an image to a user present in an enclosed space (for example, such as a cabin of a vehicle). It will be appreciated that the heads-up display (HUD) is utilised to present visual information represented in the image to the user, without requiring the user to look considerably away from his/her usual viewpoint (for example, when looking towards a road on which the vehicle is being driven). HUDs and their forms are well-known in the art.

Optionally, given tracking data is indicative of at least a pose of the user's head over a given time period. Additionally, optionally, the given tracking data is further indicative of at least one of: a linear velocity, a linear acceleration, an angular velocity, an angular acceleration, with which the pose of the user's head changes over the given time period. The given tracking data may be in the form of images, IMU/TIMU values, motion sensor data values, magnetic field strength values, or similar. It will be appreciated that the given tracking data may be collected by the tracking means continuously, periodically (for example, after every 10 milliseconds), or intermittently (for example, after 10 milliseconds, and then again after 50 milliseconds, and so on). Herein, the term "given tracking data" encompasses at least the first tracking data, and the term "given time period" encompasses at least the first time period.

Throughout the present disclosure, the term "pose" encompasses both a viewing position and a viewing direction of the user's head. It will be appreciated that the at least one processor obtains the first tracking data from the tracking means in real time or near-real time (i.e., without any latency/delay). It will also be appreciated that the pose of the user's head may not necessarily be same during an entirety of the given time period (as a movement of the user's head is fundamentally unpredictable), and thus said pose may change at different time instants during the given time period. In such a case, the given tracking data would be indicative of different poses of the user's head corresponding to the different time instants during the given time period. In other words, the given tracking data would be indicative of one or more poses of the user's head.

It will be appreciated that since the first tracking data is indicative of different poses of the user's head corresponding to different time instants during the first time period, the at least one processor can easily and accurately predict the first future pose, for example, by interpolating or extrapolating from a trend with which the different poses of the user's head change. Optionally, in this regard, the at least one processor is configured to process the given tracking data using at least one data processing algorithm, in order to predict a given future pose. Optionally, the at least one data processing algorithm comprises at least one of: a data interpolation algorithm, a data extrapolation algorithm, a feature detection algorithm. The aforesaid data processing algorithms are well-known in the art.

Throughout the present disclosure, the term "future pose" refers to an expected pose (i.e., a predicted pose) of the user's head at the future time instant. It is to be understood that the first future pose is a pose from a perspective of which the at least one processor would generate the image that is to be displayed at the future time instant. The term "future time instant" refers to a time instant at which an output image is expected to be displayed at the display. It will be appreciated that the future time instant could be different from an actual time instant at which the output image is actually displayed at the display. Moreover, the future time instant could be refined (namely, updated) at the at least one processor as well as at the display.

Optionally, the at least one processor is configured to generate the image according to a viewing position and a viewing direction of the user's head as indicated by the first future pose. In some implementations, the image may be a visual representation of an XR environment from a perspective of the first future pose of the user's head, wherein said visual representation is generated by the at least one processor, for example, using a three-dimensional (3D) model of the XR environment (as discussed hereinbelow). Techniques for utilising the 3D model to generate images based on different poses are well-known in the art. In other implementations, the image may represent at least one virtual object. In such a case, the at least one virtual object is generated based on the first future pose. In this regard, the at least one processor is configured to employ at least a virtual object generation algorithm. The term "virtual object" refers to a computer-generated object (namely, a digital object). Examples of the at least one virtual object may include, but are not limited to, a virtual navigation tool (such as a virtual map), a virtual gadget, a virtual entity (such as a virtual person, a virtual animal, a virtual ghost, and the like). Optionally, in some cases, the at least one virtual object is to be embedded on a video-see-through (VST) image captured by at least one camera of the HMD device, for subsequently generating an MR image.

The term "visual representation" encompasses colour information represented in a given image, and additionally optionally other attributes associated with the given image (for example, such as depth information, transparency information, and the like). Optionally, the colour information represented in the given image is in form of at least one of: Red-Green-Blue (RGB) values, Red-Green-Blue-Alpha (RGB-A) values, Cyan-Magenta-Yellow-Black (CMYK) values, Luminance and two-colour differences (YUV) values, Red-Green-Blue-Depth (RGB-D) values, Hue-Chroma-Luminance (HCL) values, Hue-Saturation-Lightness (HSL) values, Hue-Saturation-Brightness (HSB) values, Hue-Saturation-Value (HSV) values, Hue-Saturation-Intensity (HSI) values, blue-difference and red-difference chroma components (YCbCr) values.

The term "three-dimensional model" of the XR environment refers to a data structure that comprises comprehensive information pertaining to objects or their parts present in the XR environment. Such comprehensive information is indicative of at least one of: surfaces of the objects or their parts, a plurality of features of the objects or their parts, shapes and sizes of the objects or their parts, poses of the objects or their parts, materials of the objects or their parts, colour information of the objects or their parts, depth information of the objects or their parts, light sources and lighting conditions within the XR environment.

Throughout the present disclosure, the term "stripe" refers to a segment of the image, said segment comprising the plurality of scanlines. It will be appreciated that the image is not generated all at once, but is generated in a stripe-by-stripe manner, the plurality of stripes being generated according to the first future pose. This means that each stripe of the image could be rendered or processed by the at least one processor as a discrete block within the image. It will also be appreciated that the plurality of stripes would be arranged in the image along a given direction (for example, such as a horizontal direction, a vertical direction, a diagonal direction, a concentric direction, or the like), depending on the scanning pattern (i.e., how the image is to be displayed at the display, for example, such a raster scan-like pattern). Moreover, a granularity of each stripe (namely, a size or a thickness of each stripe) of the image may vary, based on at least one of: a configuration of the display, processing resources available to the at least one processor. Throughout the present disclosure, the term "scanline" refers to a series of pixels in a given stripe of the image. It will be appreciated that such a series of pixels could be in a form of a horizontal line of pixels, a vertical line of pixels, a diagonal line of pixels, a concentric-ring of pixels, or the like.

Prior to reprojecting the image, the at least one processor obtains more recent tracking data (namely, the second tracking data), and predicts the second future pose corresponding to the future time instant. The second future pose is to be understood to be an updated (namely, refined) version of the first future pose, that is determined based on the more recent tracking data that is available to the at least one processor. The second time period (during which the second tracking data is collected by the tracking means) may or may not partially overlap with the first time period. However, since the second time period ends after the first time period, the second tracking data is indicative of more recent/latest poses of the user's head, as compared to the first tracking data. Therefore, it is likely that the second future pose is more accurate than the first future pose. It is to be understood that the second time period ends after the first time period but still earlier than the future time instant. It will be appreciated that the at least one processor obtains the second tracking data in real time or near-real time. Prediction of the second future (using the second tracking data) pose can be performed in a similar manner, as discussed earlier with respect to the first future pose that is predicted using the first tracking data.

Notably, when the image is reprojected in the stripe-wise manner, instead of reprojecting an entirety of the image in one go to generate the reprojected image, each of the plurality of stripes of the image (i.e., from the first stripe to the last stripe from amongst the plurality of stripes) is reprojected to generate the reprojected image. It will be appreciated that depending on different scanning patterns, the image can be reprojected in different stripe-wise manners. In some implementations, the image can be reprojected in a horizontal stripe-wise manner according to a horizontal scanning pattern, wherein stripes of the image are reprojected in a top-to-bottom direction or in a bottom-to-top direction, wherein each stripe comprises horizontal scanlines. In other implementations, the image can be reprojected in a vertical stripe-wise manner according to a vertical scanning pattern, wherein stripes of the image are reprojected in a left-to-right direction or in a right-to-left direction, wherein each stripe comprises vertical scanlines. In yet other implementations, the image can be reprojected in a diagonal stripe-wise manner according to a diagonal scanning pattern, wherein stripes of the image are reprojected in a diagonal direction (for example, such as from a top-left corner to a bottom-right corner of the image), wherein each stripe comprises diagonal scanlines. In still other implementations, the image can be reprojected in a radial stripe-wise manner according to a radial scanning pattern, wherein stripes of the image are reprojected in a radially-inward direction or a radially-outward direction, wherein each stripe comprises radial (namely, concentric ring-shaped) scanlines.

It will be appreciated that the aforesaid processing steps for performing said reprojection, are performed from the first stripe to the last stripe from amongst the plurality of stripes. In other words, the aforesaid processing steps are performed for the first stripe, a second stripe, a third stripe, a fourth stripe, and so on, till the last stripe. Herein, instead of reprojecting the given stripe from the first future pose to a single pose, the method of the present disclosure enables in reprojecting different scanlines of the given stripe from the first future pose to different respective poses that are either predicted or interpolated. Firstly, the start pose for the given stripe (namely, for each of the plurality of stripes) is determined by the at least one processor. The term "start pose" refers to an expected pose of the user's head corresponding to a beginning of the given stripe. The term "starting scanline" refers to a scanline present at the beginning of the given stripe. Once the start pose for the given stripe is known, the at least one processor reprojects the at least one starting scanline of the given stripe from the first future pose to the start pose for the given stripe. Optionally, in this regard, when reprojecting a given scanline of the given stripe from the first future pose to a given pose, the at least one processor is configured to employ a reprojection algorithm. The reprojection algorithm may perform any one of: a three degrees-of-freedom (3DOF) reprojection, a six degrees-of-freedom (6DOF) reprojection, a nine degrees-of-freedom (9DOF) reprojection. Reprojection algorithms and the three aforesaid reprojections are well-known in the art. It will be appreciated that the given scanline of the given stripe is reprojected to match a perspective of the given pose, according to a difference between the first future pose and the given pose. The phrase "reprojecting a given scanline of the given stripe" means reprojecting pixel data of pixels in the given scanline of the given stripe, from the first future pose to the given pose. Herein, the term "given scanline" encompasses at least one of: the at least one starting scanline, the at least one intermediate scanline, the at least one ending scanline. Moreover, the term "given pose" encompasses at least one of: the start pose, the interpolated pose, the end pose.

Since there is no stripe present before the first stripe, the start pose for the first stripe is determined as the second future pose. Optionally, in this regard, the at least one processor is configured to reproject at least one starting scanline of the first stripe, from the first future pose to the second future pose. However, from the second stripe onwards (till the last stripe), there would be at least one stripe that precedes a next stripe. In such a case, the end pose for the given stripe (namely, a previous stripe) is to be served as the start pose for the (immediate) next stripe. For example, the end pose for the first stripe is to be served as a start pose for the second stripe, an end pose for the second stripe is to be served as a start pose for the third stripe, an end pose for the third stripe is to be served as a start pose for the fourth stripe, and so on. The technical of benefit of employing the end pose for the given stripe as the start pose for the next stripe is that it facilitates in providing a continuity and a smooth transition between two consecutive stripes of the image. In this way, unlike the prior art, abrupt jumps or considerable mismatches in tracked poses of the user's head at a time instant between a transition between the two consecutive stripes do not adversely impact reprojection of the image. Beneficially, due to this, a likelihood of visual discontinuities or artifacts (such as the image tearing) being present in the reprojected image is also minimised. This significantly improves an overall viewing experience of the user (for example, in terms of realism and immersiveness).

It will be appreciated that since the third tracking data is indicative of different poses of the user's head corresponding to different time instants during the third time period, the at least one processor can easily and accurately predict the end pose for the given stripe, for example, by interpolating or extrapolating from a trend with which the different poses of the user's head change. Optionally, in this regard, the at least one processor is configured to process the third tracking data using the at least one data processing algorithm, in order to predict the end pose for the given stripe. Optionally, the third time period ends after the second time period. It will also be appreciated that for each stripe, when at least one starting scanline of said stripe is reprojected, the at least one processor is configured to the predict the end pose for said stripe using the third tracking data. This means that the third tracking data would be freshly collected (and processed) each time when at least one starting scanline of a new stripe (namely, a subsequent stripe) is reprojected. In other words, the third tracking data would be collected at different time instants when (starting scanlines of) different stripes of the image are reprojected. In such a case, the third time period corresponding to two or more stripes may or may not partially overlap, because the two or more stripes are reprojected at different time instants.

Notably, the at least one intermediate scanline is present between the at least one starting scanline and the at least one ending scanline of the given stripe. The term "interpolated pose" refers to a pose that is determined by way of interpolating said start pose and said end pose for the given stripe. The term "intermediate scanline" refers to a scanline present between the at least one starting scanline and the at least one ending scanline. In an example, for sake of better understanding and clarity, there could be a total of 20 scanlines in a given stripe, wherein first 2 scanlines in the given stripe are starting scanlines, last 2 scanlines in the given stripe are ending scanlines, and remaining 16 scanlines in between the 2 starting scanlines and the 2 ending scanlines, are intermediate scanlines. Reprojection of the at least one intermediate scanline is performed in a similar manner, as described earlier. It is to be understood that when there are multiple intermediate scanlines between the at least one starting scanline and the at least one ending scanline (i.e., when the at least one intermediate scanline comprises a plurality of intermediate scanlines), different interpolated poses are determined corresponding to different intermediate scanlines. The technical benefit of performing the reprojection of the at least one intermediate scanline according to the interpolated pose is that it ensures a smooth, gradual transition from said start pose to said end pose across the given stripe. Due to this, visual artifacts such as stuttering and image tearing are considerably minimised, when the reprojected image is displayed to the user. This potentially enhance an overall viewing experience of the user, as an overall visual continuity would be improved as a sequence of reprojected images is displayed to the user. This also ensures that when a pose of the user's head is changing whilst viewing an object, visual representation of said object being displayed to the user (via displaying the sequence of reprojected images) would be well-consistent with a motion of user's head, and would also be stutter-free.

Optionally, the interpolated pose comprises at least one of: an interpolated position, an interpolated orientation, wherein the interpolated position is determined using a linear interpolation (LERP) algorithm, and wherein the interpolated orientation is determined using a spherical linear interpolation (SLERP) algorithm. Herein, the term "interpolated position" refers to a position that is determined by way of interpolating two known positions in a 3D space of the real-world environment. Using interpolated positions for performing reprojection allows for smooth transitions from one position to another position, by gradually adjusting a position of an object (such as the user's head) over time, ensuring a smooth movement rather than abrupt shifts in positions. Further, the term "interpolated orientation" refers an orientation that is determined by way of interpolating two known orientations in the 3D space. Using interpolated orientations for performing reprojection allows for smoothly adjusting a manner in which a viewing direction changes over a time period, thereby preventing jerky or sudden changes in a direction of rotation. The LERP algorithm is typically used to interpolate between two points in the 3D space. It involves calculating intermediate positions along a straight line connecting said two points, ensuring a gradual and consistent transition therebetween. The LERP algorithm is typically employed for position interpolation in computer graphics. On the other hand, the SLERP algorithm is typically used to interpolate between two orientations or rotations in the 3D space. Unlike the LERP algorithm, which works on straight lines, the SLERP algorithm involves calculating intermediate orientations along a shortest path between two points that lie on a sphere. This results in smooth, natural rotational transitions, especially when dealing with 3D objects or camera movements. Determining the interpolated positions and the interpolated orientations using the LERP algorithm and the SLERP algorithm, respectively, is well-known in the art. It will be appreciated that the interpolated pose could also be determined using other well-known techniques beyond those mentioned hereinabove.

Optionally, the method further comprises determining the interpolated pose by taking into account at least one of: a linear velocity, a linear acceleration, an angular velocity, an angular acceleration, with which a pose of a user's head changes over a given time period. In this regard, by considering the at least one of: the linear velocity, the linear acceleration, the angular velocity, the angular acceleration, the at least one processor would be able to understand a dynamics of the user's head movement in a comprehensive manner. This facilitates in performing the interpolation between two known poses in highly accurate manner. This is because instead of merely assuming a constant movement of the user' head between two poses, the aforesaid approach recognises that in real-world scenarios, a motion of the user's head often involves varying speeds and changing directions as the movement of the user's head is uneven or unpredictable. For example, the user's head may accelerate or decelerate, and its orientation may also change at different rates. Such a level of detail allows for a more precise and realistic interpolation of a position and an orientation of the user's head over time, avoiding inaccuracies that may likely occur with a typical linear interpolation, which assumes a constant motion.

The term "end pose" refers to an expected pose of the user's head corresponding to an end of the given stripe. The term "ending scanline" refers to a scanline present at the end of the given stripe. Once the at least one intermediate scanline is projected, the at least one processor reprojects the at least one ending scanline of the given stripe from the first future pose to the end pose for the given stripe. Reprojection of the at least one ending scanline is performed in a similar manner, as described earlier. Advantageously, when the given stripe is reprojected in the aforesaid manner, a smooth, gradual transition from the start pose to the end pose across the given stripe is ensured, even when an accuracy of pose prediction is not significant. Thus, the reprojected image is free from any visual discontinuities or artifacts (such as the image tearing). This improves an overall viewing experience of the user, when such reprojected images are displayed to the user (via the display.) Throughout the present disclosure, the term "display" refers to a specialised equipment that is capable of displaying images in the stripe-wise manner. Upon performing said reprojection, the stripes of the reprojected image are sent to the display for displaying thereat in the stripe-wise manner. In other words, the stripes would be sequentially sent to the display, where they are shown in order, ensuring that the reprojected image reflects real-time changes in the user's head pose. Such a method allows for efficient and dynamic updates to images while minimising a visual lag or visual inconsistencies.

Optionally, the method further comprises determining the interpolated pose between said start pose and said end pose for the given stripe, based on weightages of said start pose and said end pose for the given stripe corresponding to the at least one intermediate scanline of the given stripe. In this regard, when there are multiple intermediate scanlines between the at least one starting scanline and the at least one ending scanline (i.e., when the at least one intermediate scanline comprises a plurality of intermediate scanlines), different interpolated poses are determined corresponding to different intermediate scanlines, based on respective weightages of said start pose and said end pose of the given stripe. It will be appreciated that, when determining an interpolated pose for a given intermediate scanline that lies near the at least one starting scanline, a weightage of said start pose is higher than a weightage of said end pose. On the other hand, when determining an interpolated pose for another given intermediate scanline that lies near the at least one ending scanline, a weightage of said end pose is higher than a weightage of said start pose. This means that greater a distance of the given intermediate scanline from the at least one starting scanline, lesser is the weightage of said start pose and greater is the weightage of said end pose, when determining the interpolated pose for the given intermediate scanline. Similarly, greater a distance of the another given intermediate scanline from the at least one ending scanline, lesser is the weightage of said end pose and greater is the weightage of said start pose, when determining the interpolated pose for the given intermediate scanline. This is because near a start of the given stripe (i.e., near the at least one starting scanline), said start pose would dominate over said end pose when determining an interpolated pose for an intermediate scanline, as said start pose would be more relevant at that time instant. When a distance of an intermediate scanline from the at least one starting scanline is more (namely, when said intermediate scanline lies closer to the at least one ending scanline), said end pose would dominate over said start pose, when determining an interpolated pose for said intermediate scanline, as said end pose would be more relevant at that time instant. It will be appreciated that there could also be a case where a given intermediate scanline could be equidistant from the at least one starting scanline and the at least one ending scanline. In such a case, the weightage of said start pose and the weightage of said end pose are same (i.e., 50 percent for each pose), when determining an interpolated pose for the given intermediate scanline.

In an example, there may be 5 intermediate scanlines I1, I2, I3, I4, and I5 between a starting scanline and an ending scanline of the given stripe. In such a case, weightages of said start pose and said end pose for determining an interpolated pose for the intermediate scanline I1 may be 80 percent and 20 percent, respectively. Weightages of said start pose and said end pose for determining an interpolated pose for the intermediate scanline I2 may be 60 percent and 40 percent, respectively. Weightages of said start pose and said end pose for determining an interpolated pose for the intermediate scanline I3 may be 50 percent and 50 percent, respectively. Weightages of said start pose and said end pose for determining an interpolated pose for the intermediate scanline I4 may be 40 percent and 60 percent, respectively. Weightages of said start pose and said end pose for determining an interpolated pose for the intermediate scanline I5 may be 20 percent and 80 percent, respectively.

The technical benefit of determining interpolated poses in the aforesaid manner is that it ensures a smooth, gradual transition from said start pose to said end pose across the given stripe, when performing the reprojection for the plurality of intermediate scanlines, based on the (determined) interpolated poses. Due to this, visual artifacts such as stuttering and image tearing are considerably minimised, when the reprojected image is displayed to the user. This may potentially enhance an overall viewing experience of the user, as an overall visual continuity would be improved as a sequence of reprojected images is displayed to the user. This also ensures that when the pose of the user's head is changing whilst viewing an object, visual representation of said object being displayed to the user (via displaying the sequence of reprojected images) would be well-consistent with a motion of user's head, and would also be stutter-free.

It will be appreciated that an interpolated pose for the at least one starting scanline would be same as said start pose for the given stripe (i.e., a 100 percent weightage of said start pose). Moreover, an interpolated pose for the at least one ending scanline would be same as said end pose for the given stripe (i.e., a 100 percent weightage of said end pose). It is to be noted that the aforesaid manner of determining the interpolated poses can be preferably employed when there would not be a prediction error in estimating/predicting said start pose and said end pose for the given stripe, or when the prediction error would not be taken into account while performing the reprojection. However, when the prediction error is to be taken into account, an intermediate pose that lies between said start pose and said end pose, can be predicted, and said reprojection can be performed accordingly. Such an implementation will be discussed later in detail.

Optionally, a number of scanlines in at least one stripe from amongst the plurality of stripes is predefined. In this regard, the number of scanlines (namely, a blend distance) in the at least one stripe is fixed (namely, constant), and is known to the at least one processor prior to performing any reprojection for (scanlines of) the at least one stripe. It will be appreciated that when the number of scanlines are fixed and pre-known, the at least one processor can conveniently determine interpolated poses for respective intermediate scanlines between at least one starting scanline and at least one ending scanline of the at least one stripe, and can accordingly perform reprojection for (scanlines of) the at least one stripe, in real time or near-real time. In other words, the at least one processor can pre-emptively know how a pose interpolation is to be performed between a start pose and an end pose of the at least one stripe, as the start pose, the end pose, and the number of scanlines for the at least one stripe are known. Beneficially, this allows the at least one processor to efficiently and consistently plan the pose interpolation, ensuring a smooth pose transition (namely, a seamless pose blending) across the at least one stripe, whilst minimising any computational delays, as the at least one processor can allocate its remaining processing resources accordingly, and avoid real-time re-calculations during image rendering. It will be appreciated that the first stripe of the image optionally comprises a predefined number of scanlines. Optionally, a number of stripes in a given image lies in a range of 2 to 100. Optionally, the number of scanlines in the at least one stripe lies in a range of 3 to a half of a total number of stripes in the given image. It will be appreciated that having two or more stripes in the given image may enable in gradually smoothing out prediction errors over multiple stripes. If only one stripe were used, there would not be enough possibility for a smoothing process to take place; thus having a minimum of two stripes in the given image may potentially allow for a multi-stripe approach of gradually correcting pose prediction errors. Further, an upper limit on the number of stripes may be determined based on at least one of: computational resources of the at least one processor, a number of scanlines in the display. This may be because greater the number of stripes in the given image, greater is the utilisation of computational resources of the at least one processor for processing reprojected images, and vice versa. Beneficially, the method and the system enable in making a balance between a stripe size (namely, a blend distance) and a total number of stripes, for generating reprojected images in a time-efficient and computationally-efficient manner.

In an embodiment, the method further comprises:
  obtaining, from the tracking means, fourth tracking data collected over a fourth time period, and predicting the start pose for the next stripe using the fourth tracking data;
  estimating a prediction error between the predicted start pose for the next stripe and the end pose for the given stripe that is to be served as the start pose for the next stripe; and
  dynamically adjusting a number of scanlines in the next stripe, based on a magnitude of the prediction error, prior to performing a reprojection for the next stripe.

In this regard, the prediction error is estimated, for example, by determining an absolute difference between the predicted start pose for the next stripe and the end pose for the given stripe (that is to be served as the start pose for the next stripe). Greater the difference between the predicted start pose for the next stripe and the end pose for the given stripe, greater is the magnitude of the prediction error, and vice versa. In other words, when the predicted start pose for the next stripe is significantly different from the end pose for the given stripe, the prediction error would be higher, as compared to a case when the predicted start pose for the next stripe is similar/close to the end pose for the given stripe.

It will be appreciated that greater the prediction error, greater is the number of scanlines in the next stripe, and vice versa. In other words, when the magnitude of the prediction error is high, the number of scanlines in the next stripe can be increased. This is because the (significant) difference between the predicted start pose for the next stripe and the end pose for the given stripe can be gradually blended/smoothed out, by increasing the number of scanlines in the next stripe. Beneficially, this facilitates in ensuring a stuttering-free visual experience for the user, when the reprojected image is displayed to the user. This is because in a scenario where the prediction error is high, and the number of scanlines would remain unchanged (i.e., fixed), the at least one processor may not have enough time (in terms of the number of scanlines or the blend distance) to smoothly perform the pose interpolation between the start pose and an end pose of the next stripe, and the pose interpolation may occur too quickly. Due to this, reprojection for the next stripe may be compromised, and may result in an abrupt transition between two consecutive stripes, leading to visual stuttering or jumping when the reprojected image is displayed to the user. In order to mitigate such a potential problem, the number of scanlines in the next stripe are dynamically adjusted in the aforesaid manner. It is to be understood that when the magnitude of the prediction error is minimal, the number of scanlines in the next stripe can remain same, or can be optionally decreased. This is because the predicted start pose for the next stripe would not be significantly different from the end pose for the given stripe, and thus a large blend distance need not necessarily be required for gradually blending/smoothing out the (minimal) prediction error.

It will also be appreciated that the difference between the predicted start pose for the next stripe and the end pose for the given stripe exists (irrespective of its magnitude), because more recent tracking data (i.e., the fourth tracking data) is available to the at least one processor in a time instant between completing a reprojection for the given stripe (which is previous to the next stripe) and starting a reprojection for the next stripe. Optionally, the fourth time period ends after the third time period. It is to be noted that the predicted start pose would only be used for estimating the prediction error and adjusting the number of scanlines, and would not be used for any reprojection. The end pose for the given stripe that is to be served as the start pose for the next stripe, is used for performing the reprojection for (scanlines of) the next stripe accordingly. It is to be understood that the at least one processor is optionally configured to predict the start pose for the next stripe by processing the fourth tracking data (upon its collection) in a similar manner, as discussed earlier with respect to processing the first tracking data.

In an alternative embodiment, wherein a number of scanlines in each of the plurality of stripes is predefined, and wherein the method further comprises:
  obtaining, from the tracking means, fourth tracking data collected over a fourth time period, and predicting the start pose for the next stripe using the fourth tracking data;
  estimating a prediction error between the predicted start pose for the next stripe and the end pose for the given stripe that is to be served as the start pose for the next stripe;
  detecting when the prediction error exceeds a predetermined threshold error; and
  when it is detected that the prediction error exceeds the predetermined threshold error, performing a reprojection for the next stripe by extending said reprojection across at least two subsequent stripes, wherein the at least two subsequent stripes include the next stripe.

Herein, collection of the tracking data, prediction of the start pose for the next stripe, and estimation of the prediction error are performed in a same manner, as described earlier with respect to the previous embodiment. It will be appreciated that when the prediction error exceeds the predetermined threshold error, it means that a difference between the predicted start pose of the next stripe and the end pose for the given stripe is significantly high, in order to correct the prediction error within a single stripe (i.e., the next stripe). Even if the prediction error would still be corrected within the single stripe, such a correction would not be accurate or beneficial, because a transition from the start pose of the next stripe to the end pose of the next stripe would be abrupt, and there may be a likelihood of visual inconsistencies such as image stuttering. Additionally, trying to correct a large prediction error too quickly may introduce strain on the computational resources, reducing an overall performance and risking visual artifacts. Thus, in order to mitigate such a potential issue, the at least one processor would not try to correct the prediction error within just one stripe. Instead, the at least one processor performs reprojection over two or more stripes. In such a case, a reprojection process for the next stripe is extended across two or more subsequent stripes including the next stripe. Beneficially, this allows to gradually phase out an old erroneous head pose over several stripes, smoothing the transition from the start pose of the next stripe to the end pose of the next stripe. This facilitates in ensuring a stuttering-free visual experience for the user, when the reprojected image is displayed to the user. For a position, the predetermined threshold error may lie in a range of 2 millimetres (mm) to 20 mm, whereas for an orientation, the predetermined threshold error may lie in a range of 0.5 degrees to 2 degrees.

Optionally, the method further comprises:
reprojecting at least one starting scanline of the next stripe, from the first future pose to the start pose for the next stripe, whilst obtaining, from the tracking means, fifth tracking data collected over a fifth time period, and predicting an intermediate pose for the next stripe using the fifth tracking data, wherein said intermediate pose lies between the start pose and an end pose for the next stripe;
reprojecting a first set of intermediate scanlines of the next stripe from the first future pose to an interpolated pose between the start pose and the intermediate pose for the next stripe;
reprojecting a second set of intermediate scanlines of the next stripe from the first future pose to an interpolated pose between the intermediate pose and the end pose for the next stripe; and
reprojecting at least one ending scanline of the next stripe from the first future pose to the end pose for the next stripe.

In this regard, when the prediction error is to be taken into account, the intermediate pose (that lies between the start pose and the end pose of the next stripe) can be predicted, and the reprojection for (scanlines of) the next stripe can be performed in the aforesaid manner. In other words, when an accuracy of pose prediction is not significant, reprojection of intermediate scanlines in the next stripe can be performed based on piecewise pose interpolations. Optionally, in this regard, upon reprojecting the at least one starting scanline of the next stripe, the at least one processor is configured to: determine interpolated poses corresponding to respective ones of the intermediate scanlines belonging to the first set, wherein said interpolated poses lie between the start pose and the intermediate pose for the next stripe; and reproject the respective ones of the intermediate scanlines belonging to the first set from the first future pose to the determined interpolated poses. Additionally, optionally, the at least one processor is configured to: determine interpolated poses corresponding to respective ones of the intermediate scanlines belonging to the second set, wherein said interpolated poses lie between the intermediate pose and the end pose for the next stripe; and reproject the respective ones of the intermediate scanlines belonging to the second set from the first future pose to the determined interpolated poses. Lastly, the at least one ending scanline of the next stripe is reprojected from the first future pose to the end pose for the next stripe.

Advantageously, when the reprojection is performed in the aforesaid manner, a smooth, gradual transition from the start pose to the end pose across the next stripe is potentially ensured, even when the accuracy of pose prediction is not significant. This is because when a prediction error occurs, simply interpolating between the start pose and the end pose of the next stripe might not be sufficient, as a previous pose (namely, the end pose for the given stripe is to be served as the start pose for its next stripe) may carry some error. However, by introducing the intermediate pose that lies between the start pose and end pose, the at least one processor can gradually phase out the prediction error (as explained earlier). Due to this, visual artifacts such as stuttering and image tearing can be prevented, when the reprojected image is displayed to the user. By using the piecewise pose interpolations, the method enables in reducing an impact of prediction errors and ensures a smoother viewing experience without abrupt jumps or inconsistencies in tracked poses of the user's head at a time instant between a transition between the two consecutive stripes. This also ensures that when the pose of the user's head is changing whilst viewing changes in visual representation of an object, visual representation of said object being displayed to the user (via displaying the sequence of reprojected images) would be well-consistent with a motion of user's head, and would also be stutter-free.

Optionally, a number of the intermediate scanlines belonging to the first set is same as a number of the intermediate scanlines belonging to the second set. Alternatively, optionally, a number of the intermediate scanlines belonging to the first set is different from a number of the intermediate scanlines belonging to the second set. Optionally, a given set of intermediate scanlines comprises at least one intermediate scanline. Herein, the term "given set" encompasses at least one of: the first set, the second set.

It will be appreciated that the at least one processor is configured to predict the intermediate pose by processing the fifth tracking data (upon its collection) in a similar manner, as discussed earlier with respect to processing the first tracking data. Optionally, the fifth time period ends after the fourth time period. In an alternative embodiment, instead of predicting the intermediate pose for the next stripe using the fifth tracking data, the at least one processor is optionally configured to determine the intermediate pose for the next stripe, based on respective weightages of the start pose and the end pose of the next stripe. Optionally, in this regard, the at least one processor is configured to reproject the intermediate scanlines of the next stripe based on the determined intermediate pose in a similar manner, as described earlier. Preferably, the respective weightages of the start pose and the end pose of the next stripe are similar to each other. In an example implementation, the intermediate pose for the next stripe may be determined based on a 50 percent weightage of the start pose of the next stripe and a 50 percent weightage of the end pose of the next stripe.

The present disclosure also relates to the system as described above. Various embodiments and variants disclosed above, with respect to the aforementioned first aspect, apply mutatis mutandis to the system.

Optionally, the at least one processor is configured to determine the interpolated pose between said start pose and said end pose for the given stripe, based on weightages of said start pose and said end pose for the given stripe corresponding to the at least one intermediate scanline of the given stripe.

Optionally, in the system, a number of scanlines in at least one stripe from amongst the plurality of stripes is predefined.

In an embodiment, the at least one processor is configured to:
  obtain, from the tracking means, fourth tracking data collected over a fourth time period, and predict the start pose for the next stripe using the fourth tracking data;
  estimate a prediction error between the predicted start pose for the next stripe and the end pose for the given stripe that is to be served as the start pose for the next stripe; and
  dynamically adjust a number of scanlines in the next stripe, based on a magnitude of the prediction error, prior to performing a reprojection for the next stripe.

In an alternative embodiment, wherein a number of scanlines in each of the plurality of stripes is predefined, and wherein the at least one processor is configured to:
  obtain, from the tracking means, fourth tracking data collected over a fourth time period, and predict the start pose for the next stripe using the fourth tracking data;
  estimate a prediction error between the predicted start pose for the next stripe and the end pose for the given stripe that is to be served as the start pose for the next stripe;
  detect when the prediction error exceeds a predetermined threshold error; and
  when it is detected that the prediction error exceeds the predetermined threshold error, perform a reprojection for the next stripe by extending said reprojection across at least two subsequent stripes, wherein the at least two subsequent stripes include the next stripe.

Optionally, the at least one processor is configured to:
reproject at least one starting scanline of the next stripe, from the first future pose to the start pose for the next stripe, whilst obtain, from the tracking means, fifth tracking data collected over a fifth time period, and predict an intermediate pose for the next stripe using the fifth tracking data, wherein said intermediate pose lies between the start pose and an end pose for the next stripe;
reproject a first set of intermediate scanlines of the next stripe from the first future pose to an interpolated pose between the start pose and the intermediate pose for the next stripe;
reproject a second set of intermediate scanlines of the next stripe from the first future pose to an interpolated pose between the intermediate pose and the end pose for the next stripe; and
reproject at least one ending scanline of the next stripe from the first future pose to the end pose for the next stripe.

Optionally, the interpolated pose comprises at least one of: an interpolated position, an interpolated orientation, wherein the interpolated position is determined using a linear interpolation (LERP) algorithm, and wherein the interpolated orientation is determined using a spherical linear interpolation (SLERP) algorithm.

Optionally, the at least one processor is configured to determine the interpolated pose by taking into account at least one of: a linear velocity, a linear acceleration, an angular velocity, an angular acceleration, with which a pose of a user's head changes over a given time period.

DETAILED DESCRIPTION OF THE DRAWINGS

Referring to FIG. 1, illustrated are steps of a method for preventing image tearing, in accordance with an embodiment of the present disclosure. At step 102, first tracking data is obtained from tracking means, wherein the first tracking data is collected over a first time period. At step 104, a first future pose is predicted corresponding to a future time instant, using the first tracking data. At step 106, an image is generated based on the first future pose, wherein the image comprises a plurality of stripes that are generated according to the first future pose, and wherein each stripe from amongst the plurality of stripes has a plurality of scanlines. At step 108, second tracking data is obtained from the tracking means, wherein the second tracking data is collected over a second time period, and the second time period ends after the first time period. At step 110, a second future pose is predicted corresponding to the future time instant, using the second tracking data. At step 112, the image is reprojected for generating a reprojected image, in a stripe-wise manner according to a scanning pattern. Step 112 comprises subsequent steps 114a, 114b, 114c, and 114d that are performed from a first stripe to a last stripe from amongst the plurality of stripes. In this regard, at step 114a, a start pose for a given stripe is determined. At step 114b, at least one starting scanline of the given stripe is reprojected from the first future pose to said start pose for the given stripe, whilst third tracking data is obtained from the tracking means, wherein the third tracking data is collected over a third time period, and an end pose for the given stripe is predicted using the third tracking data. At step 114c, at least one intermediate scanline of the given stripe is reprojected from the first future pose to an interpolated pose between said start pose and said end pose for the given stripe. At step 114d, at least one ending scanline of the given stripe is reprojected from the first future pose to said end pose for the given stripe, wherein a start pose for the first stripe is determined as the second future pose, and wherein the end pose for the given stripe is to be served as a start pose for its next stripe. At step 116, stripes of the reprojected image are sent to a display for displaying thereat in the stripe-wise manner.

The aforementioned steps are only illustrative and other alternatives can also be provided where one or more steps are added, one or more steps are removed, or one or more steps are provided in a different sequence without departing from the scope of the claims herein.

Figure 2:
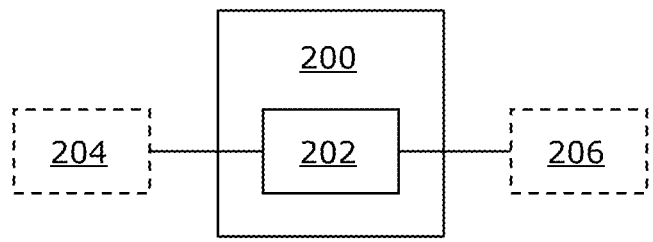
FIG. 2 illustrates a system for preventing image tearing, in accordance with an embodiment of the present disclosure.

Referring to FIG. 2, illustrated is a block diagram of an architecture of a system 200 for preventing image tearing, in accordance with an embodiment of the present disclosure. The system 200 comprises at least one processor (for example, depicted as a processor 202). The processor 202 is optionally communicably coupled to at least one of: tracking means 204, a display 206. The processor 202 is configured to perform various operations, as described earlier with respect to the aforementioned second aspect.

It may be understood by a person skilled in the art that FIG. 2 includes a simplified architecture of the system 200, for sake of clarity, which should not unduly limit the scope of the claims herein. It is to be understood that the specific implementation of the system 200 is provided as an example and is not to be construed as limiting it to specific numbers or types of processors, tracking means, and displays. The person skilled in the art will recognize many variations, alternatives, and modifications of embodiments of the present disclosure.

Figure 3A:
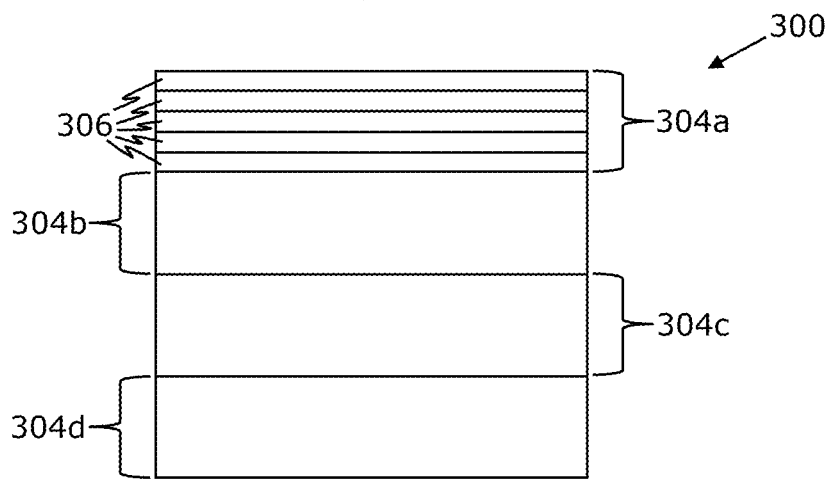
Figure 3B:
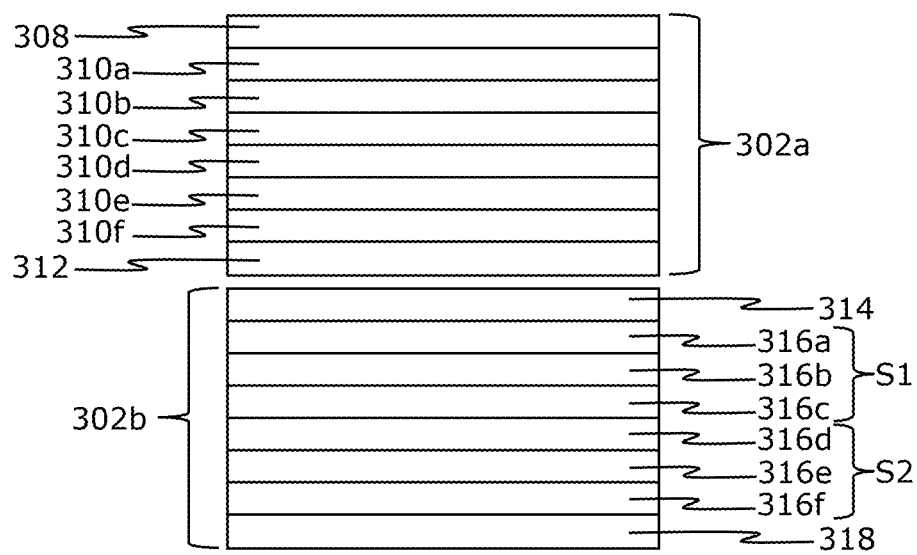
FIG. 3B illustrates two exemplary stripes of said image, in accordance with an embodiment of the present disclosure.

Referring to FIGS. 3A and 3B, FIG. 3A illustrates an exemplary image 300 that is generated based on a first future pose, while FIG. 3B illustrates two exemplary stripes 302a and 302b of said image 300, in accordance with an embodiment of the present disclosure. With reference to FIG. 3A, the image 300 comprises a plurality of stripes (for example, depicted as four stripes 304a, 304b, 304c, and 304d, for sake of simplicity and clarity) that are generated according to the first future pose, and wherein each stripe from amongst the plurality of stripes has a plurality of scanlines (for example, the stripe 304a is shown to comprise scanlines 306). For sake of simplicity and clarity, scanlines for only one stripe (i.e., a topmost stripe) are shown in FIG. 3A. In a typical implementation, the image 300 may comprise tens or hundreds of stripes, and each stripe may comprise hundreds of scanlines.

With reference to FIG. 3B, the stripe 302a comprises at least one starting scanline (for example, depicted as a starting scanline 308), at least one intermediate scanline (for example, depicted as six intermediate scanlines 310a, 310b, 310c, 310d, 310e, and 310f), and at least one ending scanline (for example, depicted as an ending scanline 312). Similarly, the stripe 302b comprises at least one starting scanline (for example, depicted as a starting scanline 314), at least one intermediate scanline (for example, depicted as six intermediate scanlines 316a, 316b, 316c, 316d, 316e, and 316f), and at least one ending scanline (for example, depicted as an ending scanline 318). The intermediate scanlines 316a, 316b, and 316c form a first set S1 of intermediate scanlines, whereas the intermediate scanlines 316d, 316e, and 316f form a second set S2 of intermediate scanlines. The stripe 302a can be considered to be a first stripe of the image, whereas the stripe 302b can be considered to be a next stripe of the image following the first stripe (namely, the stripe 302a). It is to be noted that a small gap between the stripes 302a and 302b is shown for clarity only. In a typical implementation, there would not be any gaps between two consecutive stripes of the image.

FIGS. 3A and 3B are merely examples, which should not unduly limit the scope of the claims herein. A person skilled in the art will recognize many variations, alternatives, and modifications of embodiments of the present disclosure.

Figure 4A:
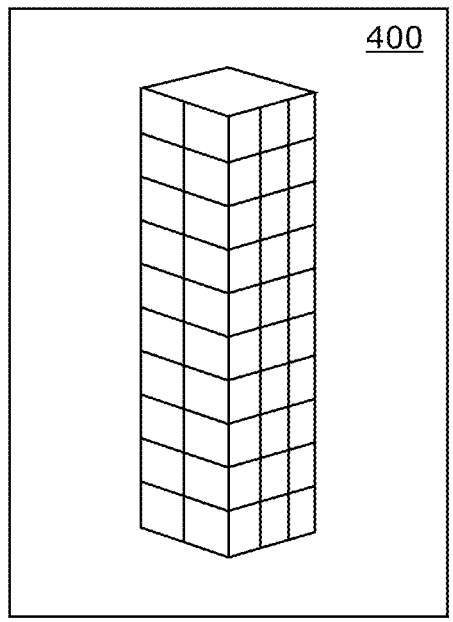
Figure 4B:
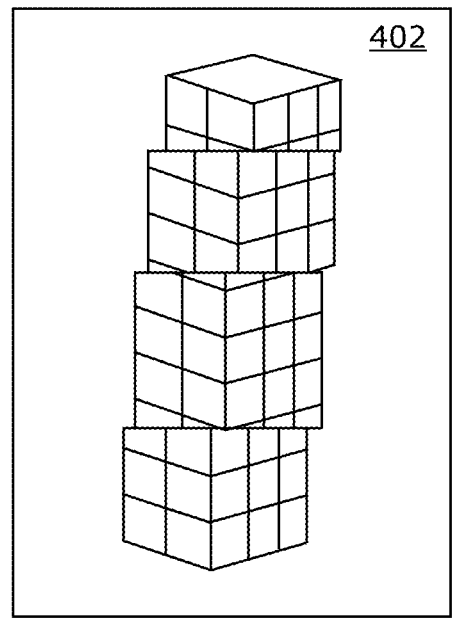
FIG. 4B illustrates an exemplary reprojected image generated using an existing technique.

Referring to FIGS. 4A and 4B, FIG. 4A illustrates an ideal image 400 that is to be reprojected prior to displaying at a display, while FIG. 4B illustrates an exemplary reprojected image 402 generated using an existing technique. With reference to FIG. 4A, the ideal image 400 represents an object (depicted as a column of wooden blocks), wherein a shape of said object is perfectly straight and smooth. In other words, the ideal image 400 has no visual discontinuities. It is to be noted that the ideal image 400 is not directly displayed to a user. The ideal image 400 is reprojected based on a current head pose of the user, prior to displaying to the user.

With reference to FIG. 4B, a problem in prior art has been illustrated. Herein, the reprojected image 402 is generated upon reprojecting the ideal image 400 (using the existing technique), based on the current head pose of the user. Upon said reprojection, the reprojected image 402 is displayed at the display in a stripe-wise manner. Herein, when a head of the user is moving, for example, in a horizontally-rightward direction, said object represented in the reprojected image 402 appears to be moving in the horizontally-rightward direction (to create an illusion of a virtual imagery responding naturally to a motion of the head of the user). However, since the existing technique does not take into account errors in pose predictions, as shown, the reprojected image 402 represents significant discontinuities between borders of stripes of the reprojected image 402, when the reprojected image 402 is displayed to the user. Due to this, the shape of said object does not appear to be smooth (i.e., said object appears to be roughly sheared) as the reprojected image 402 displayed to the user with considerable stuttering. Moreover, said discontinuities would also appear regardless of a pose interpolation that is performed during said reprojection, using the existing technique.

Figure 4C:
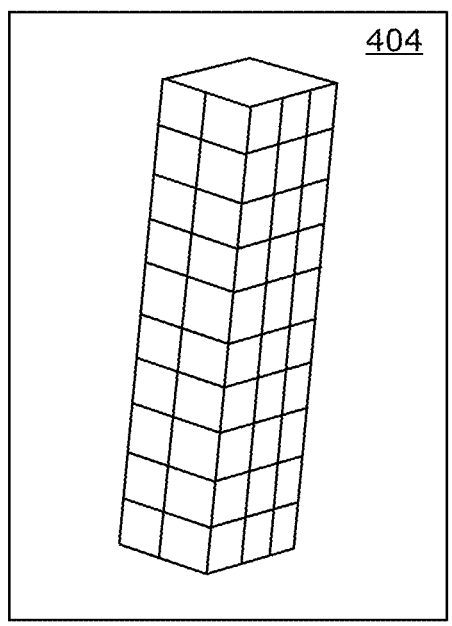
FIG. 4C illustrates an exemplary reprojected image generated using a method for preventing image tearing, in accordance with an embodiment of the present disclosure.

Referring to FIG. 4C illustrated is an exemplary reprojected image 404 generated using a method for preventing image tearing, in accordance with an embodiment of the present disclosure. The reprojected image 404 is generated upon reprojecting the ideal image 400, in a manner as described earlier with respect to the aforementioned first aspect. Upon said reprojection, when the reprojected image 404 is displayed at the display in a stripe-wise manner, the reprojected image 404 does not represent any discontinuities between borders of stripes of the reprojected image 402, as compared to a case when reprojection is performed using the existing technique (as shown in FIG. 4B). Thus, said object appears to be smoothly sheared, as the reprojected image 404 displayed to the user without any stuttering. Therefore, a viewing experience of the user is highly improved, when the reprojected image 404 is displayed to the user.

Figure 5:
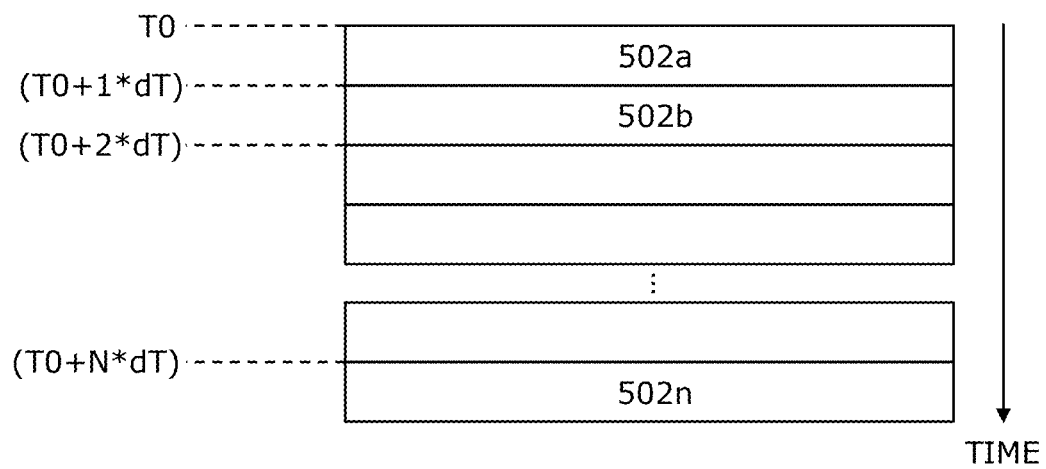
FIG. 5 illustrates an exemplary timeline for displaying stripes of a reprojected image at a display in a stripe-wise manner, in accordance with an embodiment of the present disclosure.

Referring to FIG. 5, illustrated is an exemplary timeline for displaying stripes of a reprojected image 500 at a display in a stripe-wise manner, in accordance with an embodiment of the present disclosure. Herein, the reprojected image 500 is shown to comprise N stripes, wherein a first stripe (i.e., a stripe 502a) from amongst the N stripes is displayed from a time instant T0 to a time instant (T0+1*dT), wherein dT represents a time duration taken by the display to update scanlines belonging to a given stripe. Furthermore, a second stripe (i.e., a stripe 502b) from amongst the N stripes is displayed from a time instant (T0+1*dT) to a time instant (T0+2*dT). At least one starting scanline of a last stripe (i.e., a stripe 502n) from amongst the N stripes is displayed from a time instant (T0+N*dT).

FIGS. 4C and 5 are merely examples, which should not unduly limit the scope of the claims herein. A person skilled in the art will recognize many variations, alternatives, and modifications of embodiments of the present disclosure.

The invention claimed is:

1. A method for preventing image tearing, the method comprising:
obtaining, from tracking means, first tracking data collected over a first time period;
predicting a first future pose corresponding to a future time instant, using the first tracking data;
generating an image based on the first future pose, wherein the image comprises a plurality of stripes that are generated according to the first future pose, and wherein each stripe from amongst the plurality of stripes has a plurality of scanlines;
obtaining, from the tracking means, second tracking data collected over a second time period, wherein the second time period ends after the first time period;
predicting a second future pose corresponding to the future time instant, using the second tracking data;
reprojecting the image for generating a reprojected image, in a stripe-wise manner according to a scanning pattern, wherein the step of reprojection comprises performing, from a first stripe to a last stripe from amongst the plurality of stripes:
determining a start pose for a given stripe;
reprojecting at least one starting scanline of the given stripe, from the first future pose to said start pose for the given stripe, whilst obtaining, from the tracking means, third tracking data collected over a third time period, and predicting an end pose for the given stripe using the third tracking data;

reprojecting at least one intermediate scanline of the given stripe from the first future pose to an interpolated pose between said start pose and said end pose for the given stripe; and reprojecting at least one ending scanline of the given stripe from the first future pose to said end pose for the given stripe, wherein a start pose for the first stripe is determined as the second future pose, and wherein the end pose for the given stripe is to be served as a start pose for its next stripe; and sending stripes of the reprojected image to a display for displaying thereat in the stripe-wise manner.

2. The method of claim 1, further comprising determining the interpolated pose between said start pose and said end pose for the given stripe, based on weightages of said start pose and said end pose for the given stripe corresponding to the at least one intermediate scanline of the given stripe.

3. The method of claim 1, wherein a number of scanlines in at least one stripe from amongst the plurality of stripes is predefined.

4. The method of claim 1, further comprising:
obtaining, from the tracking means, fourth tracking data collected over a fourth time period, and predicting the start pose for the next stripe using the fourth tracking data;
estimating a prediction error between the predicted start pose for the next stripe and the end pose for the given stripe that is to be served as the start pose for the next stripe; and
dynamically adjusting a number of scanlines in the next stripe, based on a magnitude of the prediction error, prior to performing a reprojection for the next stripe.

5. The method of claim 1, wherein a number of scanlines in each of the plurality of stripes is predefined, and wherein the method further comprises:
obtaining, from the tracking means, fourth tracking data collected over a fourth time period, and predicting the start pose for the next stripe using the fourth tracking data;
estimating a prediction error between the predicted start pose for the next stripe and the end pose for the given stripe that is to be served as the start pose for the next stripe;
detecting when the prediction error exceeds a predetermined threshold error; and
when it is detected that the prediction error exceeds the predetermined threshold error, performing a reprojection for the next stripe by extending said reprojection across at least two subsequent stripes, wherein the at least two subsequent stripes include the next stripe.

6. The method of claim 1, further comprising:
reprojecting at least one starting scanline of the next stripe, from the first future pose to the start pose for the next stripe, whilst obtaining, from the tracking means, fifth tracking data collected over a fifth time period, and predicting an intermediate pose for the next stripe using the fifth tracking data, wherein said intermediate pose lies between the start pose and an end pose for the next stripe;
reprojecting a first set of intermediate scanlines of the next stripe from the first future pose to an interpolated pose between the start pose and the intermediate pose for the next stripe;

reprojecting a second set of intermediate scanlines of the next stripe from the first future pose to an interpolated pose between the intermediate pose and the end pose for the next stripe; and reprojecting at least one ending scanline of the next stripe from the first future pose to the end pose for the next stripe.

7. The method of claim 1, wherein the interpolated pose comprises at least one of: an interpolated position, an interpolated orientation, wherein the interpolated position is determined using a linear interpolation (LERP) algorithm, and wherein the interpolated orientation is determined using a spherical linear interpolation (SLERP) algorithm.

8. The method of claim 1, further comprising determining the interpolated pose by taking into account at least one of: a linear velocity, a linear acceleration, an angular velocity, an angular acceleration, with which a pose of a user's head changes over a given time period.

9. A system comprising at least one processor, wherein the at least one processor is configured to:
obtain, from tracking means, first tracking data collected over a first time period;
predict a first future pose corresponding to a future time instant, using the first tracking data;
generate an image based on the first future pose, wherein the image comprises a plurality of stripes that are generated according to the first future pose, and wherein each stripe from amongst the plurality of stripes has a plurality of scanlines;
obtain, from the tracking means, second tracking data collected over a second time period, wherein the second time period ends after the first time period;
predict a second future pose corresponding to the future time instant, using the second tracking data;
reproject the image to generate a reprojected image, in a stripe-wise manner according to a scanning pattern, wherein when reprojecting said image, from a first stripe to a last stripe from amongst the plurality of stripes, the at least one processor is configured to:
determine a start pose for a given stripe;
reproject at least one starting scanline of the given stripe, from the first future pose to said start pose for the given stripe, whilst obtaining, from the tracking means, third tracking data collected over a third time period, and predicting an end pose for the given stripe using the third tracking data;
reproject at least one intermediate scanline of the given stripe from the first future pose to an interpolated pose between said start pose and said end pose for the given stripe; and
reproject at least one ending scanline of the given stripe from the first future pose to said end pose for the given stripe,
wherein a start pose for the first stripe is determined as the second future pose, and wherein the end pose for the given stripe is to be served as a start pose for its next stripe; and
send stripes of the reprojected image to a display for displaying thereat in the stripe-wise manner.

10. The system of claim 9, wherein the at least one processor is configured to determine the interpolated pose between said start pose and said end pose for the given stripe, based on weightages of said start pose and said end pose for the given stripe corresponding to the at least one intermediate scanline of the given stripe.

11. The system of claim 9, wherein a number of scanlines in at least one stripe from amongst the plurality of stripes is predefined.

12. The system of claim 9, wherein the at least one processor is configured to:
   obtain, from the tracking means, fourth tracking data collected over a fourth time period, and predict the start pose for the next stripe using the fourth tracking data;
   estimate a prediction error between the predicted start pose for the next stripe and the end pose for the given stripe that is to be served as the start pose for the next stripe; and
   dynamically adjust a number of scanlines in the next stripe, based on a magnitude of the prediction error, prior to performing a reprojection for the next stripe.

13. The system of claim 9, wherein a number of scanlines in each of the plurality of stripes is predefined, and wherein the at least one processor is configured to:
   obtain, from the tracking means, fourth tracking data collected over a fourth time period, and predict the start pose for the next stripe using the fourth tracking data;
   estimate a prediction error between the predicted start pose for the next stripe and the end pose for the given stripe that is to be served as the start pose for the next stripe;
   detect when the prediction error exceeds a predetermined threshold error; and
   when it is detected that the prediction error exceeds the predetermined threshold error, perform a reprojection for the next stripe by extending said reprojection across at least two subsequent stripes, wherein the at least two subsequent stripes include the next stripe.

14. The system of claim 9, wherein the at least one processor is configured to:
   reproject at least one starting scanline of the next stripe, from the first future pose to the start pose for the next stripe, whilst obtain, from the tracking means, fifth tracking data collected over a fifth time period, and predict an intermediate pose for the next stripe using the fifth tracking data, wherein said intermediate pose lies between the start pose and an end pose for the next stripe;
   reproject a first set of intermediate scanlines of the next stripe from the first future pose to an interpolated pose between the start pose and the intermediate pose for the next stripe;
   reproject a second set of intermediate scanlines of the next stripe from the first future pose to an interpolated pose between the intermediate pose and the end pose for the next stripe; and
   reproject at least one ending scanline of the next stripe from the first future pose to the end pose for the next stripe.

15. The system of claim 9, wherein the interpolated pose comprises at least one of: an interpolated position, an interpolated orientation, wherein the interpolated position is determined using a linear interpolation (LERP) algorithm, and wherein the interpolated orientation is determined using a spherical linear interpolation (SLERP) algorithm.

16. The system of claim 9, wherein the at least one processor is configured to determine the interpolated pose by taking into account at least one of: a linear velocity, a linear acceleration, an angular velocity, an angular acceleration, with which a pose of a user's head changes over a given time period.

* * * * *